No. 654,389. Patented July 24, 1900.
A. E. ELLINWOOD & F. A. SEIBERLING.
SYSTEM FOR CONTROLLING SERIES OF VULCANIZERS.
(Application filed Mar. 7, 1900.)

(No Model.) 6 Sheets—Sheet 1.

Fig. 1.

Witnesses:
Inventors:
Augustus E. Ellinwood,
Frank A. Seiberling,
by Humphrey & Humphrey,
Attys.

No. 654,389. Patented July 24, 1900.
A. E. ELLINWOOD & F. A. SEIBERLING.
SYSTEM FOR CONTROLLING SERIES OF VULCANIZERS.
(Application filed Mar. 7, 1900.)
(No Model.) 6 Sheets—Sheet 2.

Fig. 2.

Witnesses:
H. H. Stuart

Inventors:
Augustus E. Ellinwood,
Frank A. Seiberling,
by Humphrey & Humphrey,
Atty's.

No. 654,389. Patented July 24, 1900.
A. E. ELLINWOOD & F. A. SEIBERLING.
SYSTEM FOR CONTROLLING SERIES OF VULCANIZERS.
(Application filed Mar. 7, 1900.)
(No Model.) 6 Sheets—Sheet 3.

Witnesses:

Inventors:
Augustus E. Ellinwood,
Frank A. Seiberling
by Humphrey & Humphrey,
Atty's.

No. 654,389. Patented July 24, 1900.
A. E. ELLINWOOD & F. A. SEIBERLING.
SYSTEM FOR CONTROLLING SERIES OF VULCANIZERS.
(Application filed Mar. 7, 1900.)
(No Model.) 6 Sheets—Sheet 5.

Witnesses:
R. H. Stuart

Inventors
Augustus E. Ellinwood,
Frank A. Seiberling,
by Humphrey & Humphrey
Atty's.

No. 654,389. Patented July 24, 1900.
A. E. ELLINWOOD & F. A. SEIBERLING.
SYSTEM FOR CONTROLLING SERIES OF VULCANIZERS.
(Application filed Mar. 7, 1900.)
(No Model.) 6 Sheets—Sheet 6.

Fig.12.

Witnesses:
F. H. Stuart

Inventors:
Augustus E. Ellinwood,
Frank A. Seiberling,
by Humphrey & Humphrey,
Atty's.

THE NORRIS PETERS CO., PHOTO-LITHO., WASHINGTON, D. C.

UNITED STATES PATENT OFFICE.

AUGUSTUS E. ELLINWOOD AND FRANK A. SEIBERLING, OF AKRON, OHIO, ASSIGNORS TO THE GOODYEAR TIRE AND RUBBER COMPANY, OF SAME PLACE.

SYSTEM FOR CONTROLLING SERIES OF VULCANIZERS.

SPECIFICATION forming part of Letters Patent No. 654,389, dated July 24, 1900.

Application filed March 7, 1900. Serial No. 7,665. (No model.)

*To all whom it may concern:*

Be it known that we, AUGUSTUS E. ELLINWOOD and FRANK A. SEIBERLING, citizens of the United States, residing at Akron, in the county of Summit and State of Ohio, have invented a certain new and useful Improvement in Systems for Controlling Series of Vulcanizers, of which the following is a specification.

Our invention has a general relation to improvements in presses for the vulcanization of pneumatic tires for bicycles and other vehicles and in devices for operating said presses, and it has especial relation to that class of presses in which the two halves of the press are hinged together at one end and adapted to open and close to receive, hold, and release the tires. In the manufacture of these tires to secure perfect results it is essential that the duration of curing be accurately limited and that the process be arrested at an exact time after it begins, as if it be stopped too soon the rubber will not be properly cured and if it is continued too long the quality of the tire is injured and its strength and durability impaired. Hence extreme watchfulness on the part of the operators to secure accurate work in the process is necessary, and for this purpose time-measures, such as sand-glasses, are used; but it not infrequently happens that even these precautions are not always sufficient to insure accurate attention on the part of workmen and as a result imperfect tires and consequent direct loss as well as indirect loss from placing imperfect articles on the market results.

The objects of our invention are primarily to avoid the foregoing defects and objections by rendering the entire operation, excepting the placing and removal of the tires, wholly independent of the watchfulness or care of the attendant, and, secondarily, to cause the various operations after the placing of the tire in the mold of closing and locking the press, applying and turning off the steam, and opening the press for the removal of the cured tire to be performed automatically by mechanism governed and regulated by peculiarly constructed, arranged, and connected clock mechanism; and it further consists in devices by which a number of presses may be severally operated by the same clockwork.

To attain the aforesaid objects our invention consists in the peculiar and novel construction of parts hereinafter described and then specifically pointed out in the claims, reference being had to the accompanying drawings, forming a part of this specification.

In the accompanying drawings, in which similar reference-numerals indicate like parts in the different views.

Figure 3:
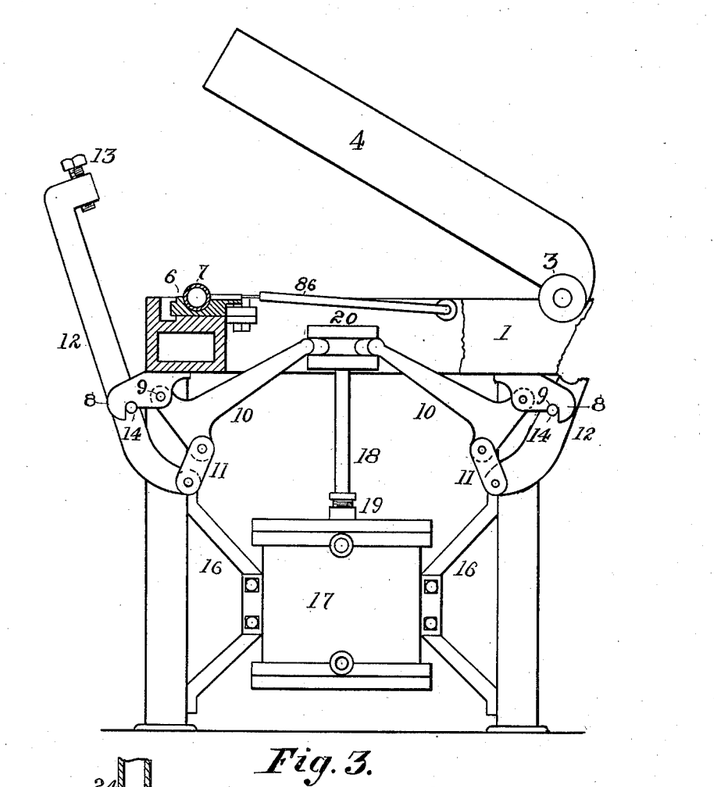
Fig. 3, a view of the press open and with parts in section to show the operating mechanism.

Referring to the figures, 1 is an annular hollow case supported on legs 2 and arranged to hold the lower half-mold for the tire to rest in. Hinged to this case on hollow journals 3 and internally connected with the case is a like annular hollow case 4, arranged to rest on and register with the lower case and having a rearwardly-extended arm 5, bearing a counterweight to balance the case 4. Inside these cases are fastened the molds for the tire, arranged to register with each other; but as these are embodied in an application already before the office it has not been deemed necessary to illustrate them, excepting that one, 6, in section and holding a tire 7, also in section, is shown in Fig. 3.

Figure 1:
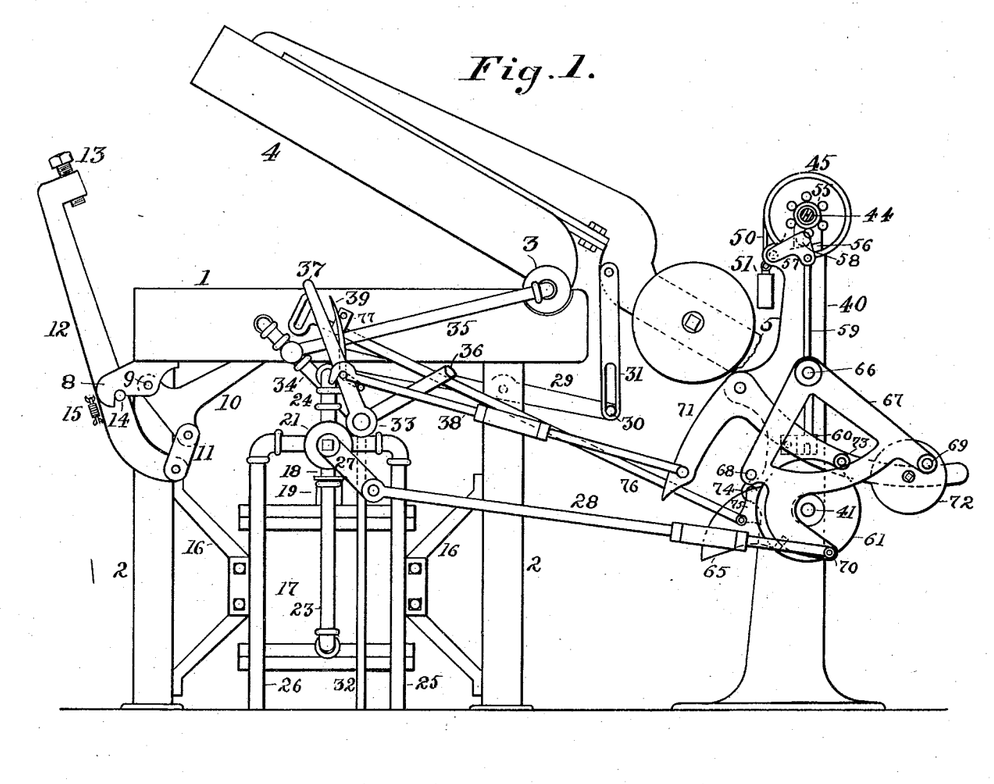
Figure 1 is a side elevation of our improved press open and showing the connected and actuating mechanism.
Figure 2:
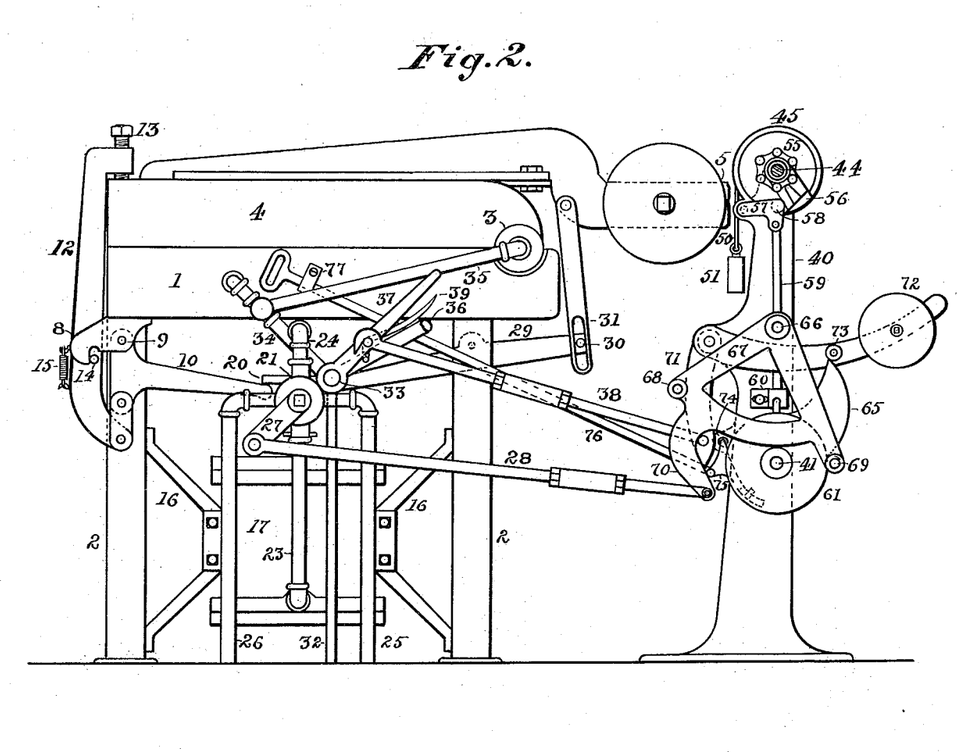
Fig. 2, a view of the same press closed and with the connected and actuating machinery in its changed position to produce the curing of the tire consequent upon such closing.

About the bottom of the case 1 there is secured at equidistant points four brackets 8, having in their front ends depending points and semicircular hooks with inner front perpendicular faces and back of these a bolt-hole. To avoid confusion of lines, but one of these brackets is shown in Figs. 1 and 2 and two in Fig. 3. Pivotally mounted in these brackets by bolts 9 are T-shaped levers 10, whose inner longer arms are rounded and converge toward the central line of the case. To the opposite shorter ends of these levers are pivotally attached links 11, which in turn are pivotally attached to the lower ends of clamp-arms 12. The upper ends of these clamp-arms have offset screw-threaded heads in which are fitted to run bolts 13 and arranged to overhang the upper case 1 when they are rocked inward. Each arm 12 bears a projecting pivot 14, adapted to enter the hooked ends of the brackets 8, and is connected with said brackets by a coiled spring 15, attached at its ends to hooks extending from each.

Figure 4:
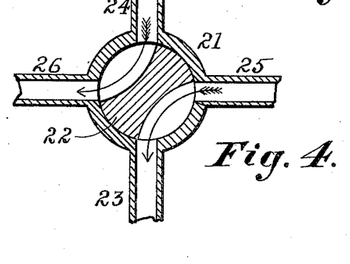
Fig. 4, a sectional view of the four-way valve for operating the hydraulic lift.

Supported centrally below the lower case 1 by braces 16 is a cylinder 17, having heads and an internal sliding piston connected with a piston-rod 18, sliding in a stuffing-box 19 and bearing in its outer end a cylindrical head 20, having in its periphery a deep groove in which the rounded ends of the longer arms of the levers 10 rest. At the side of the cylinder 17 and slightly above it is a four-way valve consisting of a cylindrical case 21 and a rocking valve 22, with pipes 23 and 24 connecting it with the lower and upper parts of the cylinder 17 and with inlet and outlet pipes 25 26, respectively, an enlarged section of which is shown in Fig. 4 and arranged in the usual manner to open the inlet on one side of the piston and the outlet on the other as the valve is rocked in either direction to actuate the piston alternately by water under pressure. On the end of the shaft of the valve 22 is attached a crank-arm 27, operated by a connecting-rod 28, connected at its opposite end with machinery to be described.

Pivotally mounted on a bolt from a boss on the under side of the case 1 is a lever 29, having a rounded end that rests in the groove in the head 20 and having in its opposite end a pin 30, that runs in a slot in a link 31, pivotally connected at its upper end with the arm 5 of the upper case.

To heat the cases 1 and 4, a pipe 32, connected with a source of live steam, leads to a three-way valve 33, (shown in enlarged section in Fig. 5,) having a pipe 34, that leads to the lower case 1, with a branch 35, that leads to and is connected by a swivel-joint with the hollow journal of the upper case 4 and an exhaust-pipe 36. On the stem of this valve is mounted a lever 37, from one side of which a pin projects, adapted to be engaged by a hook on the end of a connecting-rod 38, which is connected at its opposite end with a mechanism to be described. On the lever 37 is pivotally mounted a small bent lever 39, so arranged that when the longer end is drawn toward the lever 37 the shorter end will engage the rod 38 and raise the hook out of engagement with the pin on the lever 37.

Figures 8, 9, 10, 11:
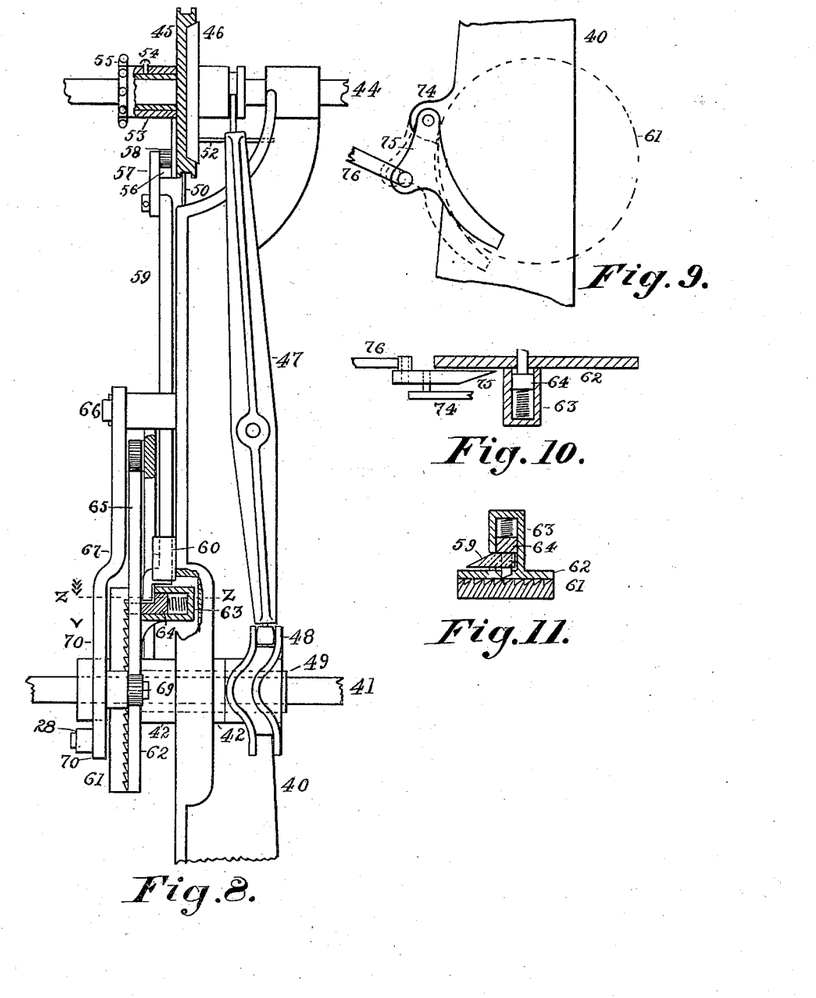
Figs. 8, 9, 10, and 11, enlarged details of different parts of the mechanism.
Figure 12:
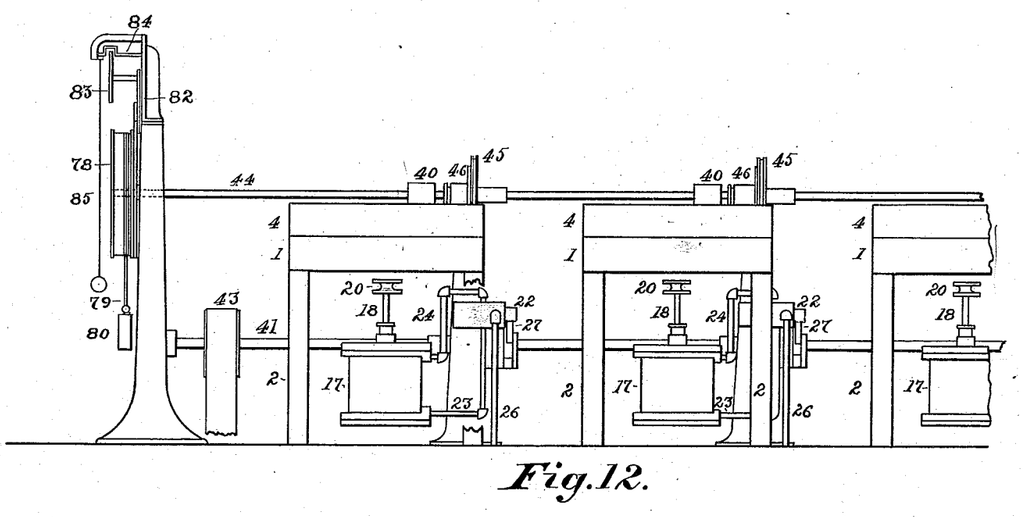
Fig. 12, an outline drawing, on a reduced scale, of the clock, with a series of presses and so much of their connected parts as will illustrate the relation of the various parts to each other to more clearly show their independent joint action.

Adjacent to each press is a post 40, through which pass two shafts—a power-shaft 41, driven by a belt and pulley 43, Fig. 12, and a time-shaft 44, driven by a clock to be described and which makes one revolution an hour. On the shaft 44 is freely mounted a grooved pulley 45, (see Fig. 8,) with a long hub or sleeve extending from one side (to the left in Fig. 8) and the other face recessed with beveled sides to form the female member of a pan-clutch. Fitting this member is the male member 46, which is feathered to slide on and revolve with the shaft 44, the hub of which is grooved and arranged to be moved by a forked lever 47, pivoted in the web at the back of the post 40 and bearing at its lower end a friction-roller that runs in a grooved cam-wheel 48, fixed on a sleeve 49, which is the elongated hub of a wheel 62, to be described, and which is free on the shaft 41. This elongated hub runs in a bearing-sleeve 42, that is integral with and extends from the face and back of the post 40 and of the same size as the hub of the cam-wheel 48. A cord 50 is fastened in the grooved pulley 45, to which is attached a weight 51, the effect of which is to constantly tend to revolve the wheel in a direction opposite to the clock-shaft motion. Projecting from the back of the pulley 45, outside of the recess, is a pin 52, Fig. 8, arranged to engage the upper part of the post 40 as the pulley revolves with the cord and arrest its further revolution. On the hub or sleeve of the pulley 45 is a sleeve 53, adjustably secured by means of a set-screw 54 and bearing a roughened finger-wheel 55 and two short arms bearing a cam-wedge 56, arranged to revolve about the face of the pulley 45 as about a clock-dial. Pivoted by one arm in the post 40 is a bell-crank 57, bearing at its angle a roller 58, arranged to be engaged and raised by the cam-wedge 56. On the opposite arm of this bell-crank is pivotally connected one end of a rod 59, the lower end of which is offset toward the front and which passes under a guide 60, which guide is grooved from below for half its length to permit the offset portion of the rod 59 to enter as it is raised. The offset end of the rod 59 is beveled at one side to a sharp edge, as shown in Fig. 11, which is a cross-section of Fig. 8 at the line Z Z. On the shaft 41 is rigidly mounted a wheel 61, having ratchet-teeth in one face, between which and the grooved cam-wheel 48 there is freely mounted a sleeve bearing a wheel 62 of like diameter with the wheel 61. In the wheel 62 is a bolt-hole, opposite which is secured a box 63, in which is a sliding bolt 64, having a square body and a round point, which point is arranged to pass through the bolt-hole in the wheel 62 and is beveled to an edge at one side to engage the ratchet-teeth of the wheel 61, and this bolt is constantly pressed outward by a coiled spring. The side of the box 63 and of the bolt 64 toward the periphery of the wheel 62 are cut away, leaving a shoulder on the former, and through the space in the box thus made the beveled end of the rod 59 passes as the wheel 62 revolves and engaging the shoulder of the bolt forces it back into the box, thus drawing the beveled end out of the ratchet-teeth in the wheel 61 and releasing the engagement between it and the wheel 62. From the edge of the wheel 62 extends a wing-cam 65 to actuate certain parts of machinery now to be described.

Figure 5:
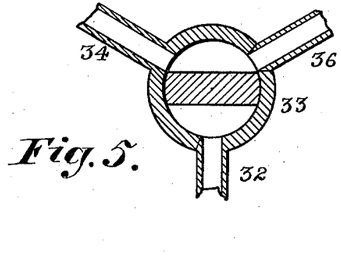
Fig. 5, a sectional view of the three-way valve for introducing and permitting the escape of live steam to and from the cases to produce vulcanization.
Figure 6:
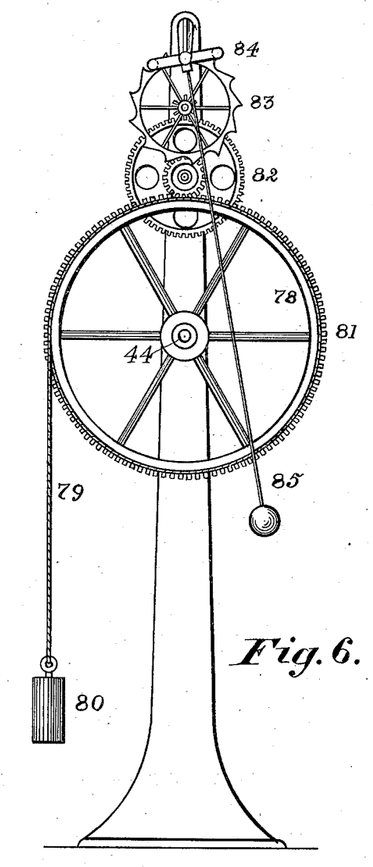
Fig. 6, a front elevation of the clock for operating the different mechanisms.
Figure 7:
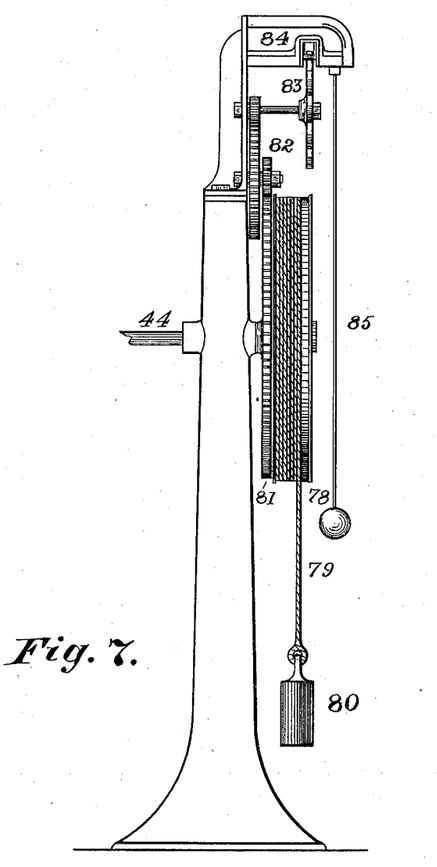
Fig. 7, a side elevation of the same.

Pivotally supported on a stud 66 of the post 40 is a rocking frame 67, substantially triangular in form, with friction-rollers 68 69 projecting from its rear face at the free corners, arranged to be engaged by and run on the edges of the wing-cam 65, and a curved arm 70, pivotally connected with one end of the rod 28. On an offset part of the post 40 is pivotally mounted an irregularly-shaped bell-crank lever 71, having curved arms, one longer than the other and bearing a weight 72 on the longer arm and a projecting stud 73 with a friction-roller to run on the edge of the wheel 62 and the wing-cam 65. The shorter arm of this lever is pivotally connected with one end of the connecting-rod 38, that operates the three-way valve 33. On a projection 74 of the post 40 is hinged a wedge 75, (shown enlarged in Figs. 9 and 10,) to the back of which is pivotally connected one end of a rod 76, which extends up beside the lower case 1 under a strap 77 and terminates in a loop-handle. This wedge 75 when thrown inward, as indicated by solid lines in Fig. 9, lies in the path of the bolt 64, hereinbefore described, and being encountered by it will force it back out of engagement with the ratchet-wheel 61, thereby arresting the revolution of the wheel 62 and consequent operation of the parts actuated by it. By reversing the operation and withdrawing the wedge 75 the bolt 64 will again engage the ratchet-wheel, and the parts will resume their respective movements. The shaft 44 is operated by the clock mechanism shown in Figs. 6 and 7, and it consists of a supporting-post in which the shaft 44 is journaled, bearing at its end a pulley 78, about which is wound a cord 79, bearing a weight 80. At the side of and connected with the pulley 78 is a spur-gear 81, which drives a train of gearing 82, provided with an escapement-wheel 83, arranged to be alternately engaged by the ends of a lever 84, bearing a pendulum 85. This escapement-wheel is peculiarly constructed, the surfaces of the teeth being tangential to the wheel, with their ends rounded inward. The lever 84 bears at each end rollers that run on the surface of the teeth and fit the rounded ends. This clockwork is arranged to cause one revolution an hour to the shaft 44, and the power-shaft 41 revolves with considerably-more rapidity. In opera-tion these shafts being in motion and the press being open, as shown in Fig. 1, an unvulcanized tire 7 is placed in the half-mold 6 in the case 1 and pierced through the valve-boss with the inspirating-tube 86 (shown in Fig. 3 and not hereinbefore mentioned) to introduce live steam to its interior from the case 1, with which the tube is internally connected. As this device is described in another application, no claim is made to it in this. The operator then disengages the hook of the connecting-rod 38 from the pin on the side of the lever 37 by means of the bent lever 39 and rocks the lever 37 to the right in Figs. 1 and 2 sufficiently to allow steam to enter the cases 1 and 4 and by means of the tube 86 inflate the tire enough to enable it to bed properly in the mold. He then throws the lever 37 back until the hook in the rod 38 drops onto the pin in the lever. He then pulls the starting-rod 76 to the left, thus swinging the wedge-pawl 75 out of engagement with the bolt 64, allowing it to enter through the hole in the wheel 62 and engage one of the ratchet-teeth on the wheel 61, and thereby cause the wheels to move together and the different parts of the apparatus to perform their several functions as follows: The wing-cam 65 encounters the roller 68 on the rocking frame 67 and swings this frame to the left and by means of the rod 28 and crank-arm 27 opens the valve 21 to let water above the piston in the cylinder 17. As the piston descends the upper case 4 descends by gravitation, being regulated by the lever 29 and slotted link 31. The lever 10, being also drawn down by the grooved cross-head 20, swings the clamp-arms 12 on the pivots 14 until they are upright and rest against the case 4, with their screw ends 13 overhanging it, immediately above shallow hollows arranged to receive the screw ends and prevent their slipping, and this occurs before the piston completes its downward stroke. As the piston continues to descend to complete its stroke the long arms of the levers 10 are drawn still farther down, thus bringing the heads of these levers and the links 11, which together form toggle-joints, in alinement and drawing the arms 12 lengthwise downward in true lines with great force on the case 4. The parts are so adjusted that as soon as these clamp-arms are thus drawn tight the wing-cam 65 encounters the roller 73 on the lever 71 and gradually raises the lever until the greatest radius of the cam is reached, as shown in Fig. 2. This movement of the lever 71 has opened the valve 33 and admitted live steam to the molds. When the revolution of the wheel 62 has reached the position last stated, its motion is arrested for a definite time to allow the tire to be vulcanized. This time is such as shall have been determined by the operator as necessary to vulcanize the particular kind of tire being constructed. The arresting of the motion of the wheel 62 is produced by the beveled end of the rod 59 encountering the bolt 64 and forcing it back out of the ratchet-faced wheel 61. The rod 59 descends by gravitation, but is raised by the wedge-cam 56, as hereinbefore stated, and the time of vulcanization of the tire is regulated by changing the position of the wedge-cam with reference to the face of the pulley 45 nearer or farther back from the roller 58 on the bell-crank 57, which is done by releasing the set-screw 54 and turning the sleeve 53, carrying the arms and wedge to the determined point and again tightening the screw. This is facilitated by having the face of the pulley graduated to represent intervals of time, but which graduation is omitted on account of the small scale on which the drawings are made. The mechanism remains in the position as shown in Fig. 5 during the time set for the vulcanization of the tire, with the clutch 46 in operative connection with the pulley 45, both revolving with the time-shaft 44 and the cam-wedge 56, approaching the roller 58 with the same motion, thereby raising the weight 51 as the pulley revolves. At the moment the cam-wedge 56 in its travel passes under the roller 58 and raises both the roller and the rod 59 the following operations take place substantially simultaneously: The raising of the shaft 59 vertically releases the bolt 64, which being forced forward by its spring passes through the wheel 62 into engagement with the ratchet-teeth of the wheel 61, which is constantly revolving with the power-shaft 41. The wheel 62, having the sleeve 49, as hereinbefore described, carries with it in its revolution the grooved cam-wheel 48, in which groove is the friction-roller of the lever 47, which tilts the lower end of the lever to the left in Fig. 8, thereby throwing out of operative connection the male member 46 from the female member of the clutch in the pulley 45. The effect of releasing these clutch members is to permit the backward revolution of the pulley 45 by force of the weight 51 and cord 50, carrying with it the cam-wedge 56 until its motion is stopped by the pin 52, which projects from the rim of the pulley 45, encountering the offset end of the post 40. This pulley remains in this position, retained by the weight, until the clutch 46 is again thrown into connection with it by the complete revolution of the grooved cam 48, when it again commences its revolution with the time-shaft 44. It should be borne in mind that just previous to the raising of the rod 59 the vulcanizer is closed and that the first operation must be to shut off the steam before the press can be opened with safety. As the wheel 62, bearing the wing-cam 65, commences its revolution in company with and driven by the ratchet-faced wheel 61 by means of the bolt 64 the roller 73, pivoted on the bell-crank 71, descends from the apex of the wing 65 on the back face to the circular part of the wheel 62 by force of the weight 72. This roller continues to ride on the circular part of the wheel 62 until it again encounters the wing 65. The effect of the descent of the roller 73 to the circular part of the wheel 62 is to force the rod 38 and lever 37 to the left, thus closing the inlet of steam to the press and by means of the three-way valve allows the escape of steam from the press through the exhaust-pipe 36. The descent of the roller 73 is purposely rapid, so as to shut off the steam before the operation to be next described commences. As the wing 65 starts on its revolution just mentioned the roller 69 on the frame 67 slowly rides up the face of the wing, swinging the frame 67, the rod 28, and the lever 27 to the right, Figs. 1 and 2, thereby turning the four-way valve 21 into the position shown in Fig. 4, allowing the water over the piston to pass down the pipe 24 through the valve 21 and escape by the outlet 26 and at the same time allow water under pressure to enter by the pipe 25 through the valve 21 to the bottom of the cylinder under the piston through the pipe 23, thereby forcing up the piston, with its rod 18 and head 20, which raises the longer ends of the levers 10 and throws the clamp-arms 12 first upwardly and then outwardly, thus releasing the cases 1 and 4 from pressure, and as the head 20 rises it carries with it the inner end of the lever 29, causing its outer end, by means of the link 31, to pull down the arm 5 and swing the case 4 upward on its journals until it has opened to its fullest extent. The tire is then removed from the mold and an unvulcanized tire placed therein, which is facilitated by slipping the valve-stem of the tire over the inspirator-tube 86 and introducing sufficient steam into it by means of the lever 37, as hereinbefore described, to inflate it for bedding properly, it being borne in mind that all steam, except such as is thus admitted, is cut off from the vulcanizer.

It will be understood that the time during which the cases are closed for the process of vulcanization can be definitely determined for any given style or kind of tire. Consequently the operation of the time-shaft 44 and cam-wedge 56 is entirely automatic and acts without any effort on the part of the operator; but the length of time necessary to the removal of cured tires and replacing of green ones must of necessity vary considerably, and therefore it is impracticable to cause the cases to close at any determined time, as in case it was desired to suspend the use of one set of molds for any reason if the closing was automatic no means would be had to prevent the continued opening and closing of the molds. Therefore when the green tire has been properly placed in the mold the operator pulls the handle of the rod 76, the immediate effect of which is to first close and lock the cases and then turn on the steam, as stated. As the wing-cam revolves from the position shown in Fig. 1 it likewise revolves the sleeve 49, on which it is mounted, which carries the grooved cam 48 and as the wing 65 reaches the position shown in Fig. 2 this cam is in the position shown in Fig. 8, with the lower end of the lever 47 thrown to the right and the clutch 46 in engagement with the pulley 45. The entire mechanism stays in this position during the predetermined time for vulcanizing, as heretofore stated, and as the cam-wedge 56 and pulley 45 are at this time revolving with the time-shaft 44, being driven by the clutch 46, the cam-wedge 56 will at its predetermined time pass under the roller 58 and the operation which we have just described be repeated.

As many presses as may be desired may be connected to be operated by the same power-shaft 41 and these movements regulated by the same clock, each being provided with a separate post 40, with its connected mechanism, as illustrated on a reduced scale in Fig. 12, and thus each may be arranged to open at a different time, so that one operator may attend to several presses.

Having thus described our invention, what we claim, and desire to secure by Letters Patent, is—

1. A system of vulcanizing-presses arranged to be substantially controlled by a definite revolving agent, consisting of a series of presses or vulcanizers each separately acting, means for causing their several operations, and a power-shaft adapted to cause such operations substantially as described.

2. A system of vulcanizing-presses arranged to be controlled substantially by a definite controlling agent, consisting of means for the regular definite operation of said presses, means for furnishing power for such operation and vulcanizing-presses arranged to be controlled by said means, substantially as shown and described.

3. A system of vulcanizing-presses consisting of a series of independent vulcanizers all arranged to be operated separately, means for causing their several definite operations and means for furnishing power for such operation, substantially as shown and described.

4. A system of vulcanizers consisting of a series of independent presses, means for causing their definite determinate operations and means as a power-driven shaft, for furnishing power for such operation at stated intervals, substantially as shown and described.

5. A system of vulcanizing-presses consisting of a series of independently-operating presses, means as a shaft, whose revolution is definitely determined, for limiting the intervals of operation of said presses, means as a power-shaft for furnishing power for such operations, substantially as shown and described.

6. A system for the operation and control of a plurality of rubber-tire vulcanizers, consisting of a definite controlling agent to cause the systematic determinate operation of a number of vulcanizers, a shaft to furnish power therefor and means for communicating the power to said vulcanizers as determined by said agent, substantially as shown and described.

7. A system for the operation and control of a plurality of rubber vulcanizers, consisting of a definite controlling agent to cause the systematic determinate operation of said vulcanizers, consisting of a shaft adapted to revolve as directed by said agent, separate mechanism attached to said shaft arranged to operate separate vulcanizers, a shaft also connected with said mechanism arranged to operate and furnish power to said mechanism at intervals determined by said agent, substantially as shown and described.

8. A system for the operation and definite control of a plurality of vulcanizers consisting of a shaft whose regularity of revolution is definitely determined, mechanism attached to said shaft for the operation of each vulcanizer, a separate shaft connecting with each set of mechanism for operating independently each vulcanizer in the series at intervals predetermined, actuated by said first shaft, substantially as shown and described.

9. A system for the operation and control of a plurality of vulcanizers, consisting of an agent arranged to revolve a time-measuring shaft at a certain speed, a shaft driven by power, mechanism attached to each vulcanizer arranged to receive its operating impulse from the first-mentioned shaft, and its power from said second shaft, and adapted to operate its individual vulcanizer at definite intervals, independent of the others in said series, substantially as shown and described.

10. A system for the control of a plurality of vulcanizers consisting of means, as a clock, for revolving at a determinate speed a shaft driven by power, independent mechanism connected with each of said vulcanizers arranged to automatically place itself in operative connection with said clock-shaft and receive impulse therefrom, in combination with said power-shaft to open said vulcanizers at a definite interval after their closing, substantially as shown and described.

11. A system for the control and operation of a plurality of vulcanizers consisting of a controlling agent, arranged to revolve a shaft at a determined speed and a shaft arranged to furnish power for such operation and mechanism to automatically open said vulcanizers at intervals determined by said first shaft and means as a hand-lever for causing the operation of said mechanism to close said vulcanizers, substantially as shown and described.

12. A system for the operation and control of a plurality of vulcanizers consisting of a series of vulcanizers, operating mechanism attached thereto, a time-measuring shaft connected with said mechanism to automatically open said vulcanizers, a power-shaft connected with said mechanism to furnish power for such operation, and means for causing the closing of said vulcanizers at the will of the operator, substantially as shown and described.

13. In a system for the operation and control of a plurality of vulcanizers, the combination of two shafts, one adapted to determinate the intervals of operation, the other to furnish power therefor, with mechanism attached to each vulcanizer and in operative connection with said shafts, arranged to automatically open said vulcanizers at predetermined intervals after the closing thereof by said mechanism at the impulse of the operator, substantially as shown and described.

14. A system for the operation and control of vulcanizing-presses for rubber tires, consisting of means for causing the opening of the several presses at definite intervals after the closing thereof, independently of each other and means and mechanism for causing the closing thereof as desired, substantially as shown and described.

15. A system for the control of a plurality of vulcanizers, consisting of means for causing the definite determinate opening of individual vulcanizers at a determined interval after the closing thereof, mechanism for arresting the supply of steam to said vulcanizers before the opening thereof, mechanism to close said vulcanizers and means for opening the supply of steam to said vulcanizers after said closing, substantially as shown and described.

16. In a system arranged to control and operate a series of vulcanizers, the combination with mechanism for the successive opening and closing of individual vulcanizers independent of each other, means for arresting the supply of steam to said vulcanizers before the opening thereof, and supplying steam to said vulcanizers after the closing thereof, of means for furnishing power for these successive operations, substantially as shown and described.

17. In a vulcanizing-press the combination with a fixed hollow case and a movable hollow case hinged thereto, of a cylinder connected with said fixed case having a piston and rod; means for introducing fluid under pressure to said cylinder to move said piston reciprocally, and a valve to control the entrance and exit of said fluid, of mechanism to connect said rod and movable case to cause the latter to open and close with the movement of said rod, substantially as shown and described.

18. In a vulcanizing-press the combination with a fixed hollow case and a movable hollow case hinged thereto, of a cylinder connected with said fixed case having a piston and rod, means for introducing a fluid under pressure to move said piston reciprocally, and a valve to control the entrance and exit of said fluid, of a pivoted lever connected with said piston-rod and movable case to open and close the latter by the movement of said piston, substantially as shown and described.

19. In a vulcanizing-press the combination with a fixed hollow case and a movable hollow case hinged thereto, of a cylinder connected with said fixed hollow case having a piston and rod, means for introducing a fluid under pressure to move said piston reciprocally and a valve to control the entrance and exit of said fluid, of a pivoted lever connected with said movable case and lever to open and close said movable case by the motion of said piston, substantially as shown and described.

20. In a vulcanizing-press the combination with a fixed hollow case and a movable hollow case hinged thereto, of a cylinder connected with said case having a piston and rod and means for causing said piston to move reciprocally, of levers connected with said piston-rod, clamps to bind said movable case and fixed case together, and intermediate connections to transmit power from said levers to said clamps, to cause them to operate, substantially as shown and described.

21. In a vulcanizing-press the combination with a fixed hollow case and a movable hollow case hinged thereto, of a cylinder connected with said fixed case having a piston and rod, and means for causing said piston to move reciprocally levers pivotally connected with said fixed case and piston-rod, clamp-arms pivotally connected with said fixed case and arranged to bind said movable case on the fixed case, and links connecting said levers and clamp-arms, substantially as shown and described.

22. In a vulcanizing-press the combination with a fixed hollow case and a movable hollow case hinged thereto, of a cylinder connected with said fixed case having a piston and rod, and means for introducing a fluid under pressure to cause said piston to move reciprocally, of clamp-arms pivotally connected with said fixed case and capable of a rocking and vertical motion, arranged to rock to and overhang said movable case, and levers pivotally connected with said fixed case and piston-rod, and connected with said clamp-arms by links, to rock said arms in position to overhang said movable case, and to draw them vertically to bind the same, substantially as shown and described.

23. In a vulcanizing-press, the combination with a fixed hollow case and a movable hollow case hinged thereto, of a cylinder with said fixed case having a piston and rod, and means for introducing a fluid under pressure to cause said piston to move reciprocally, clamp-arms having pivots adapted to rest in inverted hooks on said fixed case and capable of a rocking and vertical motion, arranged to rock to and overhang said movable case and fall and rock away from said movable case, and levers pivotally connected with said fixed case and piston-rod, and connected with said clamp-arms by links, to swing said arms in position to overhang said movable case, to draw them vertically to bind the same, and to draw the lower ends inward to release them from said case and rock them outward substantially as shown and described.

24. In a vulcanizing-press the combination with a fixed hollow case and a movable case hinged thereto, of a cylinder connected with said fixed case having a piston and rod and means for introducing a fluid under pressure to cause said piston to move reciprocally, clamps having pivots adapted to rest in inverted hooks on said fixed case and capable of a rocking and vertical motion, arranged to rock to and overhang said movable case, and to rise and rock away from it, levers pivotally connected with said fixed case and piston-rod and connected with said clamps by links and springs severally connecting each clamp and hook to cause said arms to rise, substantially as shown and described.

25. In a vulcanizing-press the combination with a fixed hollow case and movable hollow case hinged thereto, of a cylinder connected with said fixed case, having a piston and rod and means for introducing a fluid under pressure to cause said piston to move reciprocally, a pivoted lever connected with said piston-rod, a slotted link connected with said movable case and lever to open and close said movable case, clamps pivotally connected with said fixed case, capable of a rocking and a vertical motion, arranged to rock to and overhang said movable case, and bent levers pivotally connected with said fixed case and piston-rod, and connected with said clamps to swing said arms to said movable case, draw them upon it and rock away from it, substantially as shown and described.

26. In a vulcanizing apparatus the combination with a fixed hollow case and a movable case hinged thereto, of power-driven mechanism connected with said fixed case, levers connected with and arranged to be rocked by said mechanism, clamps to bind said cases together and intermediate connection to transmit power from said levers to said clamps to cause them to operate, substantially as shown and described.

27. In a vulcanizing apparatus, the combination with a fixed hollow case and a movable hollow case hinged thereto, a cylinder having a piston and rod, means for introducing a fluid under pressure to cause said piston to move reciprocally, a lever arranged to be actuated by said piston to open and close said movable case, of a rocking frame arranged by means of intermediate mechanism to control and regulate the entrance of fluid to said cylinder, and driving mechanism to operate said frame and regulate its action, substantially as shown and described.

28. In a vulcanizing-press the combination with a fixed hollow case and a movable hollow case hinged thereto, a cylinder having a piston and rod, a valve to cause said piston to move reciprocally, a lever arranged to be actuated by said piston to open and close said movable case, a valve to introduce live steam to said cases, of a rocking frame arranged by means of intermediate mechanism to control and regulate the entrance of fluid to said cylinder, and of steam to said cases, driving mechanism to operate said frame and a clock to regulate its action, substantially as shown and described.

29. In a vulcanizing-press the combination with a fixed and movable case, a cylinder having a piston and rod, a valve for introducing a fluid under pressure to cause said piston to move reciprocally, mechanism arranged to be actuated by said piston to move said movable case from the fixed case, and a valve to introduce live steam to said cases, of a rocking frame arranged by means of intermediate mechanism to control and regulate the entrance of fluid to said cylinder, separate rocking mechanism arranged to be operated by said frame to control the entrance and exit of steam from said cases, driving mechanism to operate said frame, and a clock to regulate its action, substantially as shown and described.

30. The combination with a vulcanizing-press having a fixed and a movable case, and a cylinder and piston arranged by intermediate connections to cause said movable case to separate from and meet said fixed case, locking mechanism for said cases adapted to be operated by said piston, means for introducing steam to said cases, and a fluid under pressure to cause said cylinder to operate said piston, and valves for controlling said fluid and steam, of mechanism for separately actuating said fluid and steam valves, and a device for adjusting said mechanism to perform their respective functions with reference to each other, substantially as shown and described.

31. The combination with a vulcanizing-press having a fixed and a movable case and a cylinder and piston arranged by intermediate connections to cause said movable case to approach and recede from said fixed case, locking mechanism for said cases adapted to be operated by said piston, means for introducing steam to said cases, and fluid under pressure to said cylinder to operate said piston, and valves for controlling said fluid and steam, of power-driven mechanism for operating said fluid and steam valves, and a clock to regulate the operation of said mechanism, substantially as shown and described.

32. The combination with a vulcanizing-press having a fixed and a movable case, and a cylinder and piston arranged by intermediate connections to cause said movable case to approach and recede from said fixed case, locking mechanism for said cases adapted to be operated by said piston, means for introducing live steam to said cases, and a fluid under pressure to said cylinder to operate said piston, and valves for controlling said fluid and steam, of power-driven mechanism for operating said fluid and steam valves, a device for adjusting said mechanisms to perform their respective functions with reference to each other, and a clock to regulate the operation of said mechanism, substantially as shown and described.

33. The combination with a vulcanizing-press having a fixed and a movable case, of mechanism to cause said movable case to meet and part from the fixed case, devices to operate said mechanism and a clock to control said devices, substantially as shown and described.

34. The combination in a vulcanizing apparatus having opening molds and a hydraulic cylinder to open and close said molds, with a valve to operate it, of a power-driven ratchet-wheel, a rocking frame connected with and arranged to open and close said valve, a wheel bearing a cam arranged to engage and rock said frame, a spring-pressed bolt in said cam-wheel arranged to engage said ratchet-wheel to cause said wheels to revolve together, a movable pawl to withdraw and release said bolt, and a handle to operate said pawl, substantially as shown and described.

35. The combination in a vulcanizing apparatus having opening molds with a valve to operate it, of a power-driven ratchet-wheel, a rocking frame connected with and arranged to open and close said valve, a wheel bearing a cam arranged to engage and rock said frame, a spring-pressed bolt on said cam-wheel arranged to engage said ratchet-wheel to cause said wheels to revolve together, a sliding bar having a beveled end to withdraw said bolt, and a clock-regulated wheel to withdraw said bar, substantially as shown and described.

36. The combination in a vulcanizing apparatus having opening molds and a hydraulic cylinder to open and close said molds with a valve to operate it, of a power-driven ratchet-wheel, a rocking frame connected with and arranged to open and close said valve, a wheel bearing a cam arranged to engage and rock said frame, a spring-pressed bolt, in said cam-wheel, arranged to engage said ratchet-wheel to cause said wheels to revolve together, a sliding bar having a beveled end to withdraw said bolt, a clock-regulated wheel, adjacent to said bar and an adjustable cam-wedge to revolve with said clock-regulated wheel, to engage and withdraw said bar, substantially as shown and described.

37. The combination in a vulcanizing apparatus having opening molds and a hydraulic cylinder to open and close said molds, with a valve to operate it, of a power-shaft, a ratchet-wheel on said shaft, a rocking frame connected with and arranged to open and close said valve, a wheel bearing a cam-wedge to engage and rock said frame, a spring-pressed bolt in said cam-wheel arranged to engage said ratchet to cause said wheels to revolve together, a sliding bar having a beveled end to withdraw said bolt, a clock-regulated shaft bearing a time-wheel adjacent to said bar, an adjustable cam-wedge to revolve with said time-wheel to engage and withdraw said bar, a clutch to drive said time-wheel, a lever to operate said clutch and a grooved cam-wheel on said power-shaft to operate said clutch, substantially as shown and described.

38. The combination in a vulcanizing apparatus having opening, hollow, mold-holding cases, steam-pipes for heating said cases and a valve to control said steam-pipes, of a rocking bell-crank connected with and arranged to open and close said valve, a power-driven ratchet-wheel, a wheel bearing a cam arranged to engage and rock said bell-crank, and a spring-pressed bolt in said cam-wheel to engage said ratchet-wheel to cause said wheels to revolve together, substantially as shown and described.

39. The combination in a vulcanizing apparatus having opening, hollow, mold-holding cases, steam-pipes for heating said cases, and a valve to control said steam-pipes, of a rocking bell-crank lever connected by a hooked rod to the lever of said valve and arranged to open and close said valve, a power-driven ratchet-wheel, a wheel bearing a cam arranged to engage and rock said bell-crank lever, a spring-pressed bolt in said cam to cause said wheels to revolve together and a tripping-lever on said valve-lever to disengage said hooked rod, substantially as shown and described.

In testimony that we claim the above we hereunto set our hands in the presence of two subscribing witnesses.

AUGUSTUS E. ELLINWOOD.
FRANK A. SEIBERLING.

In presence of—
C. P. HUMPHREY,
C. E. HUMPHREY.